Jan. 16, 1962 J. A. LYNE 3,016,991
HYDRAULIC TURBO BRAKE
Filed Jan. 26, 1959 2 Sheets-Sheet 1
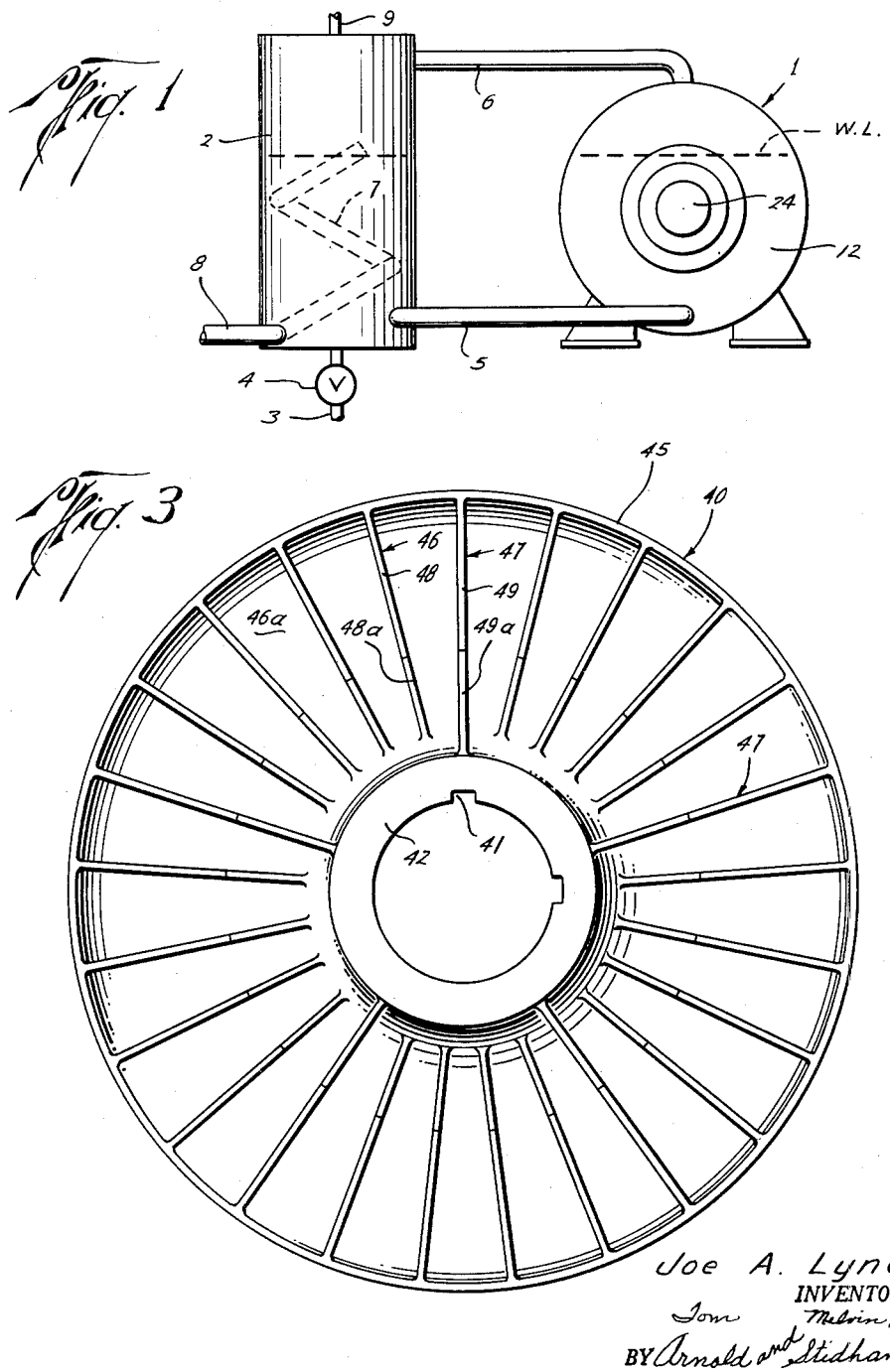
Joe A. Lyne
INVENTOR.
BY Arnold and Stidham
ATTORNEY

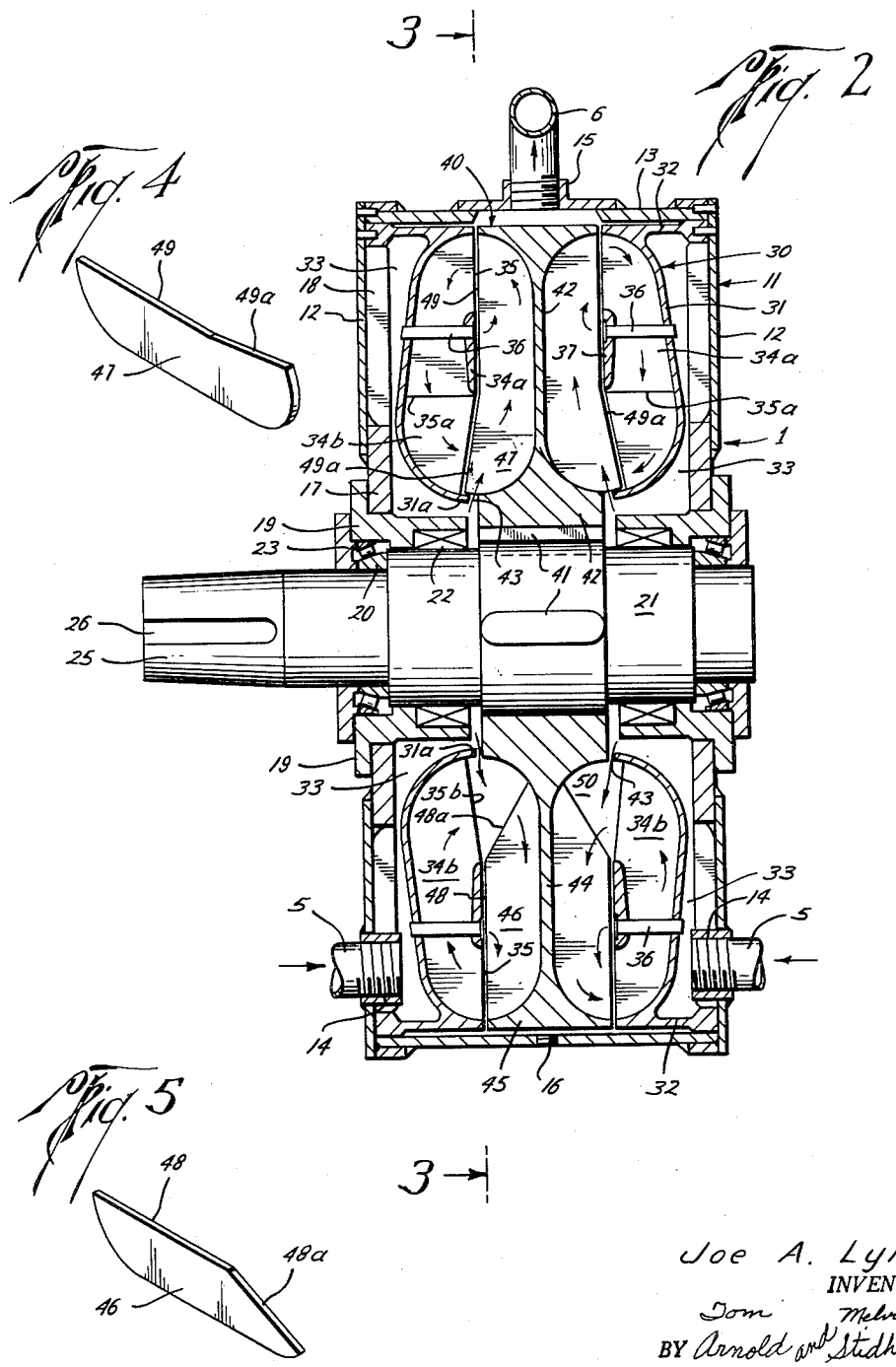

United States Patent Office 3,016,991
Patented Jan. 16, 1962

3,016,991
HYDRAULIC TURBO BRAKE
Joe A. Lyne, 106 Ferndale, Bellaire, Tex.
Filed Jan. 26, 1959, Ser. No. 788,860
4 Claims. (Cl. 188—90)

This invention relates to hydraulic turbo brakes, and more particularly, to a hydrodynamic brake having a wide range of control over fluid delivery therein for close control of resistance to varying loads.

Hydrodynamic brakes are commonly used to control or restrict shaft speeds and are particularly useful in conjunction with oil field hoisting equipment to limit the speed at which pipe or tools are lowered into a well. Hydrodynamic brakes generally have rotor and stator assemblies, each having radial vanes to form opposing pockets or cups. In brakes of this type water is generally employed as the fluid braking medium to circulate between the pockets of the rotor and stator and resist relative movement thereof. Consequently, it is extremely important to control the amount of water in the brake in accordance with the work load or resistance required. Moreover with the conversion of mechanical energy into heat taking place within the water resulting from the resistance thereof, it is necessary to maintain circulation through the brake in order to replace heated water with cool water. Frequently, water is introduced into the brake through a series of nozzles extending into the brake and disposed so that circulation of the fluid already within the brake past the nozzle discharge opening creates a vacuum to draw water out of the nozzle and into the brake.

With the nozzles arranged in a circular row concentric to the brake shaft, the depth of water in a common reservoir will determine the number of nozzles feeding fluid into the brake. In this way, the capacity of the brake can be controlled closely to meet varying load requirements. However, as the load increases and pressure is built up within the brake the rate of feed, being dependent upon pressure differential, falls off to the extent that maximum brake capacity cannot be achieved.

Moreover, another major disadvantage of present hydrodynamic brakes resides in the inefficient circulation of fluid in and between the stator and rotor pockets. Generally, the fluid flows radially outward in the rotor pockets across to the opposed stator pockets wherein it flows radially inward. Usually, it is found desirable to terminate vanes of the rotor (and stator) radially outward from the hub to afford enough circumferential space throughout each pocket and thereby avoid entrapment of fluid. However, the relatively flat radial rotating surface of the rotor before the vanes tends to throw off fluid impinging thereon from the stator, particularly at high speeds. Consequently, the efficiency of circulation within the brake pockets themselves, is materially retarded at advanced shaft speeds.

It is, therefore, an object of my invention to provide a means for delivering fluid under pressure to the working chamber of a hydrodynamic brake to achieve maximum capacity.

It is a further object of my invention to provide a fine control variable fluid feed combined with a pressure fluid feed to achieve maximum brake capacity.

It is a further object of my invention to provide a means to increase circulation of brake fluid between stator and rotor pockets.

It is a further object of my invention to provide a hydrodynamic brake having rotor vanes that function as impellers to implement circulation within and between the brake pockets.

It is a further object of my invention to provide rotor vanes that cooperate with the stator blades to function as centrifugal pump vanes and thereby increase fluid delivery to the working chamber of the brake.

In carrying out my invention, I provide a circumferential series of nozzles opening into the stator pockets from an annular reservoir or manifold extending around the shaft. When the level of fluid moves around and up in the reservoir to approach the elevation of the shaft and meet the demands of load increases, the fluid may also enter the brake through a clearance provided between the stator and the hub of the rotor. Certain of the rotor blades are extended to bridge this clearance so as to terminate within the cross-sectional area of the stator and thus engage and centrifugally impel fluid entering the brake chamber through the clearance. This auxiliary pump effect of the rotor blades increases the feed capacity of the brake by overcoming the resistance to further intake caused by pressure build-up within the brake chamber.

Other objects and advantages of my invention will become apparent from the specification following when read in conjunction with the accompanying drawings wherein:

FIG. 1 is a diagrammatic view illustrating my complete hydrodynamic brake system;

FIG. 2 is a diametrical section view through the brake;

FIG. 3 is a section view taken along line 3—3 of FIG. 2;

FIGS. 4 and 5 are perspective views of two different rotor vanes.

Referring now to the drawings in particular, FIG. 1 illustrates the circulation of fluid through my hydrodynamic brake system and shows fluid being delivered to the brake 1 from a reservoir or surge tank 2. Cool water is delivered from a source thereof (not shown) through a supply pipe 3, the flow being controlled by a suitable valve 4. The relatively cooler water at the bottom of the tank is then delivered through feed pipes 5 into the brake until the water level W.L. is reached. Steam and hot water formed by the absorption of heat energy within the brake 1 is removed by pipe 6 and carried back to the surge tank 1.

The desired water level W.L. is maintained by means of an open pipe or hose 7, the open end of which is adjustable in elevation. While I have shown an accordion-like swing pipe 7, it is equally obvious that a flexible hose, telescopically arranged pipes or any similar flexible or extensible tubular member may be employed with equal efficacy. In any event, the overflow pipe 7 removes the relatively hot water from the top of the tank 2 and discharges it through outlet pipe 8. A breather pipe 9 is preferably provided at the top of the tank 2 in order to equalize pressure in the tank and the brake 1 at atmospheric pressure.

Referring now to FIG. 2, my hydrodynamic brake is enclosed within a housing indicated generally at 11 and comprising annular side plates 12 and a cylindrical cover 13. Couplings 14 are provided in the side walls 12 near the bottom of the housing 11 to receive the fluid inlet pipes 5 and a coupling 15 is provided through the top of the cylindrical cover 13 for the outlet pipe 6. Preferably, a drainage plug 16 is provided at the bottom of the cylindrical cover 13.

In my preferred construction, the side plates 12 are welded or otherwise secured to rigid heavy duty rings 17 of steel or the like having strength ribs 18 radiating therefrom. Journal members 19 carrying suitable anti-friction bearings 20 to rotatably receive a shaft 21 are in turn rigidly secured to the rings 17. The journal members 19 also carry suitable leak proof packing 22 in fluid tight sealing engagement with the shaft 21. The bearings 20 are protected by annular cover plates 23. One end 25 of the shaft 21 projects outwardly from the housing and has a keyway 26 or similar means for coupling to the shaft the speed of which is to be controlled.

Stator members shown generally at 30 are secured within the housing 11 and each comprises an annular wall 31 of curvilinear cross-section held within the housing 11 in spaced relation with the side plates 12 by bolting, welding or otherwise rigidly securing the side plates to an annular flange 32 integral with the wall 31. As shown in FIG. 2, the stator wall 31 curves radially inward and away from the side plates 12, the spaces 33 between the side plates 12 and the stator walls 31 and extending to the shaft seals 22 forming annular reservoirs for fluid being fed into the brake, as will hereinafter be explained.

A series of radial vanes 34a and 34b, each lying generally in an axial plane, are secured around the stator walls 31 to form the usual fluid pockets. The outer portion 35 of each stator vane 34a and 34b lies substantially in a radial plane. However the inner portion 35a of most of the vanes terminates above the inner edge of the wall 31 so that their converging relationship does not trap or confine the fluid. Certain of the vanes 34b taper back gradually at 35b so that its radially inner end is spaced just slightly from the inner annular edge 31a of the stator wall 31.

Extending through the stator wall 31 is a circumferential series of nozzles 36 which deliver fluid from the annular manifold reservoir 33 to discharge adjacent to the radial edge 35 of the stator vanes 34a and 34b. Preferably, each nozzle 36 is disposed in a plane parallel to the shaft 21 and may be angled somewhat in the direction of rotation to increase the vacuum created by circulation of fluid thereby. Additionally, I may provide a shroud ring 37 secured in circumferentially aligned recesses in the stator vanes 34 to insure proper circulation of the fluid.

The rotor member 40 is keyed to the shaft 21 as at 41 and includes a hub portion or trunnion 42. The rotor hub 42 is spaced from the inner edge 31a of the stator wall so as to provide a clearance 43 in direct communication with the annular reservoir 33 so that fluid may be fed therethrough into the chambers formed between the rotor and stators. Integral with the rotor hub 42 is the circular rotor wall 42 terminating in an annular flange 45. Between the hub and the flange is a circumferential series of generally radial vanes 46 and 47. Since the radial vanes naturally converge toward the axis of the rotor the pockets tend to become more and more restrictive to the impedance of fluid circulation. Most of the vanes 46 have outer radial edges 48 which lie closely adjacent to the radial edges 35 of the stator vanes but which are tapered back at their inner portions 48a (see FIGS. 3 and 5) to afford more capacity for freedom of circulation near the hub portion of the rotor. However, by terminating the pockets 46a short of the hub a free smooth, substantially radial surface 50 surrounding the hub 42 is presented to water flowing radially inward and across in the direction of the arrows in FIG. 2 from the stator 30. Such a surface rotating at high speeds tends to throw fluids off and circulation is materially impeded. Therefore, certain of the rotor vanes operate as impeller blades 47. For example, every fifth vane, has its outer radial edges 49 tapering outward at 94a (FIGS. 3 and 4) to follow the contour of the outer edges 35 of stator vanes 34a and 34b and the entire length of the edges 35, 35b of the vanes 34b, and, more significantly, to bridge the clearance 43 between the inner annular edge 31a of the stator wall 31 and the rotor hub 42 and actually extend into the axial cross-section area of the stator 30. In this way, the rotor vanes 47 function as impellers and increase delivery of fluid through the clearance 43 under pumping action and to pick up fluid flowing from the stator as soon as it leaves the wall 31 and the vanes 34 to impell it into increased circulation.

In operation of my apparatus fluid (probably water) is fed to the brake 1 through intake lines 5 by adjusting the height of the water level in the surge tank 2 according to the elevation of the open swing pipe 7. Since the water rises up and around the annular reservoirs or intake manifolds 33 it is apparent that the height of the water level in the tank and hence in the annular reservoir 33 will determine the number of nozzles 36 from the circular row thereof that will be covered by the water. Consequently, a very close control over feed of water to the brake for varying load conditions can be maintained by control of the height of the water in the tank 2. When increased load conditions necessitates an increase in fluid to bring the level up near the shaft 21, the fluid may also enter between the rotor and stator members through the clearance 43. In this instance, feed of the fluid is positive since the centrifugal pumping of the inner vane portions 49a of the pump vanes 47 increase the feed pressure sufficiently to overcome the inherent resistance of pressure build-up in the working chamber of the brake.

As the fluid absorbs mechanical energy and transforms it into heat energy, water heated within the brake chamber is discharged through pipe 6, with the rotor itself functioning as an impeller to increase the discharge rate.

While I have described a preferred embodiment of my invention, it is apparent that many changes and modifications can be made therein without departing from the spirit and scope of my invention which is defined by the claims appended hereto.

Having described my invention, I claim:

1. A fluid brake comprising a housing, a shaft extending through said housing and rotatable therein and adapted to have impressed thereon torque which it is desired to oppose by braking force, a rotor mounted on said shaft within said housing and having a concave wall of annular form, a stator within said housing, said stator having a concave annular wall spaced axially from one end of said housing and cooperating with said rotor annular wall to define a fluid chamber between said stator annular wall and said rotor annular wall, the inner circular edge of said stator annular wall being spaced radially from said shaft and axially from said rotor to provide a clearance for fluid flow into the fluid chamber between said rotor and said stator, the outer circular edge of said stator annular wall being spaced axially from said rotor annular wall to afford fluid flow from the fluid chamber space between said rotor and said stator;

a conduit from a source of fluid opening into said housing between said one end and said stator annular wall, a plurality of generally radial vanes carried within each of said rotor and said stator concave annular walls to form opposing fluid pockets, the radially inner termini of said stator vanes being spaced axially from said inner circular edge, a plurality of said rotor vanes having portions thereof extending axially across said clearance and into the concavity of said stator annular wall to rotate adjacent said stator annular wall and said radially inner termini, and a plurality of annularly spaced nozzles extending through said stator annular wall affording fluid communication between said fluid chamber and the space between said housing one end and said stator annular wall.

2. In a fluid brake comprising a rotatable shaft adapted to have impressed thereon torque which it is desired to oppose by braking force, a rotor mounted on said rotatable shaft and carrying a plurality of vanes which form rotor pockets open on one side thereof, and a stator carrying a plurality of vanes which form stator pockets open on one side thereof, said open sides of said rotor and stator pockets being positioned opposite each other whereby said rotor and stator pockets together define a fluid chamber of annular form divided by said vanes into pockets, and passage means affording fluid discharge from the radially outward portion of said fluid chamber;

the further combination therewith of a plurality of fluid conduits positioned in and annularly spaced around said stator, said conduits opening at one end into communication with said fluid chamber and being connectable at the other end to a source of fluid, a fluid passage into said annular fluid chamber at the radially inward portion thereof, and rotor vane portions adjacent said fluid passage for effecting movement of fluid through said fluid passage into said chamber when said rotor vane portions are in motion.

3. A fluid brake comprising the combination of a rotatable shaft adapted to have impressed thereon torque which it is desired to oppose by braking force, a rotor mounted on said rotatable shaft and having a wall of concave form with a plurality of vanes therein whereby rotor pockets open on one side are formed, a stator having a wall of concave form with a plurality of stator vanes therein whereby stator pockets open on one side are formed, said stator pockets and said rotor pockets being positioned opposite each other whereby said concave walls define a fluid brake chamber with said vanes therein;

said combination being further characterized by said rotor vanes protruding from the rotor into the concavity of said stator wall at the radially inward end of said stator concavity.

4. In a fluid brake comprising a rotatable shaft adapted to have impressed thereon torque which it is desired to oppose by braking force, a rotor mounted on said rotatable shaft and carrying a plurality of vanes which form rotor pockets open on one side thereof, and a stator carrying a plurality of vanes which form stator pockets open on one side thereof, said open sides of said rotor and stator pockets being positioned opposite each other whereby said rotor and stator pockets together define a fluid chamber of annular form divided by said vanes into pockets, and passage means affording fluid discharge from the radially outward portion of said fluid chamber;

the further combination therewith of a plurality of fluid conduits positioned in and annularly spaced around said stator, said conduits opening at one end into communication with said fluid chamber and being connectable at the other end to a source of fluid, a fluid passage into said annular fluid chamber at the radially inward portion thereof, and rotor vane portions adjacent said fluid passage for effecting movement of fluid through said fluid passage into said chamber when said rotor vane portions are in motion;

at least one of said rotor vanes extending across the line of separation of rotor from stator and into the portion of said fluid chamber defined by the radially inward portion of the stator.

References Cited in the file of this patent

UNITED STATES PATENTS

| | | |
|---|---|---|
| 1,985,889 | Mater et al. | Jan. 1, 1935 |
| 1,992,911 | Mater | Feb. 26, 1935 |
| 2,226,558 | Fitzpatrick | Dec. 31, 1940 |
| 2,790,518 | Wilson | Apr. 30, 1957 |
| 2,889,013 | Schneider | June 2, 1959 |